United States Patent
Cui et al.

(10) Patent No.: US 8,987,629 B2
(45) Date of Patent: Mar. 24, 2015

(54) PROCESS OF CLOSING AN OPENING IN A COMPONENT

(75) Inventors: Yan Cui, Greer, SC (US); Gitahi Charles Mukira, Simpsonville, SC (US); Srikanth Chandrudu Kottilingam, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1075 days.

(21) Appl. No.: 12/511,494

(22) Filed: Jul. 29, 2009

(65) Prior Publication Data

US 2011/0024393 A1 Feb. 3, 2011

(51) Int. Cl.
*B23K 9/04* (2006.01)
*B23K 31/00* (2006.01)
(Continued)

(52) U.S. Cl.
CPC .............. *F01D 5/147* (2013.01); *B23K 10/027* (2013.01); *B23K 2201/001* (2013.01);
(Continued)

(58) Field of Classification Search
CPC ................ B22C 21/14; B23K 10/027; B23K 2201/001; B23K 26/3213; B23K 26/345; F01D 5/147; F05D 2230/10; F05D 2230/21; F05D 2230/232
USPC ........... 219/76.1, 69.17, 69.14, 57, 58, 73.21, 219/85.1, 121.13, 121.25, 121.45, 121.6, 219/121.7, 129, 136, 146.23, 146.32, 219/146.41, 148, 149, 158, 162; 228/119, 228/101, 260, 261, 193, 194, 248.1, 120, 228/125, 141.1, 144, 165, 174, 225, 228/262–262.9
See application file for complete search history.

(56) References Cited

U.S. PATENT DOCUMENTS 2,453,061 A * 11/1948 Bissout et al. ............. 219/137 R
2,867,036 A * 1/1959 Hovelmann .................. 228/165
(Continued)

FOREIGN PATENT DOCUMENTS

CN 1792534 A 6/2006
JP 50160604 A 12/1975
(Continued)

OTHER PUBLICATIONS

Unofficial English translation of CN Office Action dated Nov. 29, 2013, issued in connection with corresponding CN Application No. 201010248945.7.
(Continued)

*Primary Examiner* — Dana Ross
*Assistant Examiner* — Ket D Dang
(74) *Attorney, Agent, or Firm* — Hartman Global IP Law; Gary M. Hartman; Domenica N. S. Hartman

(57) ABSTRACT

A process for closing an opening in a surface of a component, and components formed thereby. The process entails forming a channel in the component surface so that the channel at least partially surrounds an opening at the component surface. An alloy is then deposited in the channel to form a crack-free deposit in the channel. A step is then machined that intersects the opening and is at least partially formed in the deposit. The step defines a recess that is at least partially surrounded by a peripheral portion of the deposit and has a surface recessed into the component surface. A cap is placed in the recess and welded to the peripheral portion of the deposit to define a weld joint that completely closes the opening. The surface of the weld joint is then machined to form a machined surface that is substantially flush with the component surface.

20 Claims, 3 Drawing Sheets

(51) Int. Cl.
| | |
|---|---|
| *F01D 5/14* | (2006.01) |
| *B23K 10/02* | (2006.01) |
| *B22C 21/14* | (2006.01) |
| *B23K 26/32* | (2014.01) |
| *B23K 26/34* | (2014.01) |
| *B23K 35/30* | (2006.01) |
| *C22C 19/05* | (2006.01) |
| *C22C 19/07* | (2006.01) |

(52) U.S. Cl.
CPC ............ *B22C 21/14* (2013.01); *F05D 2230/21* (2013.01); *F05D 2230/232* (2013.01); *F05D 2230/10* (2013.01); *B23K 26/3213* (2013.01); *B23K 26/345* (2013.01); *B23K 35/30* (2013.01); *B23K 35/3066* (2013.01); *C22C 19/055* (2013.01); *C22C 19/056* (2013.01); *C22C 19/07* (2013.01)
USPC .... 219/76.1; 219/57; 219/73.21; 219/121.13; 219/129; 219/146.41; 228/119; 228/260; 228/248.1; 228/174; 228/262

(56) References Cited

U.S. PATENT DOCUMENTS

| | | | | |
|---|---|---|---|---|
| 3,473,215 | A | * | 10/1969 | Stevens .......................... 228/165 |
| 3,649,805 | A | * | 3/1972 | Rohrberg .................... 219/121.5 |
| 3,733,686 | A | * | 5/1973 | Maucher ........................ 228/165 |
| 3,967,919 | A | | 7/1976 | Coulon et al. |
| 4,030,849 | A | * | 6/1977 | Keifert et al. ................. 403/272 |
| 4,221,263 | A | * | 9/1980 | Meyer ............................ 165/173 |
| 4,633,554 | A | | 1/1987 | Clark et al. |
| 4,726,104 | A | * | 2/1988 | Foster et al. ................. 29/889.1 |
| 4,810,467 | A | | 3/1989 | Wood et al. |
| 4,878,953 | A | * | 11/1989 | Saltzman et al. ............. 148/512 |
| 4,962,586 | A | | 10/1990 | Clark et al. |
| 5,086,968 | A | | 2/1992 | Fawley et al. |
| 5,154,884 | A | | 10/1992 | Wukusick et al. |
| 5,240,491 | A | * | 8/1993 | Budinger et al. ............... 75/255 |
| 5,271,048 | A | * | 12/1993 | Behnke et al. ................. 376/260 |
| 5,399,313 | A | | 3/1995 | Ross et al. |
| 5,615,826 | A | * | 4/1997 | Dixon et al. ................... 228/208 |
| 5,732,468 | A | | 3/1998 | Galley et al. |
| 5,914,055 | A | * | 6/1999 | Roberts et al. ............. 219/76.15 |
| 6,074,602 | A | | 6/2000 | Wukusick et al. |
| 6,230,958 | B1 | * | 5/2001 | Coletta et al. ............... 228/114.5 |
| 6,327,766 | B1 | * | 12/2001 | Cardente .................... 29/402.16 |
| 6,416,596 | B1 | | 7/2002 | Wood et al. |
| 6,428,637 | B1 | | 8/2002 | Wood et al. |
| 6,454,156 | B1 | * | 9/2002 | Taras et al. ..................... 228/165 |
| 6,837,417 | B2 | * | 1/2005 | Srinivasan .................... 228/119 |
| 6,883,700 | B2 | * | 4/2005 | Kottilingam et al. ......... 228/119 |
| 6,984,801 | B2 | | 1/2006 | Mega et al. |
| 7,481,350 | B1 | * | 1/2009 | Shah ............................. 228/169 |
| 7,556,469 | B2 | * | 7/2009 | Tanaka et al. ................. 414/687 |
| 7,726,023 | B2 | * | 6/2010 | Pursell ....................... 29/889.23 |
| 7,836,593 | B2 | * | 11/2010 | Allen ........................... 29/889.1 |
| 2002/0066770 | A1 | * | 6/2002 | James et al. .................. 228/119 |
| 2003/0192941 | A1 | * | 10/2003 | Ishida et al. ................ 228/112.1 |
| 2004/0056079 | A1 | * | 3/2004 | Srinivasan ................. 228/248.1 |
| 2004/0169022 | A1 | * | 9/2004 | Mega et al. ................ 219/121.64 |
| 2007/0017906 | A1 | | 1/2007 | Nowak et al. |
| 2008/0166585 | A1 | * | 7/2008 | Allen et al. ................... 428/615 |
| 2008/0268279 | A1 | * | 10/2008 | Want ............................. 428/615 |
| 2010/0059573 | A1 | * | 3/2010 | Kottilingam et al. ......... 228/164 |

FOREIGN PATENT DOCUMENTS

| | | |
|---|---|---|
| JP | 6234671 A | 2/1987 |
| JP | 03237205 A | 10/1991 |
| JP | 09168927 A | 6/1997 |
| JP | 10184309 A | 7/1998 |
| JP | 2003065068 A | 3/2003 |
| JP | 2007007730 A | 1/2007 |

OTHER PUBLICATIONS

Unofficial English translation of Office Action issued in connection with corresponding JP Application No. 2010-165440 on Mar. 11, 2014.

* cited by examiner

PROCESS OF CLOSING AN OPENING IN A COMPONENT

BACKGROUND OF THE INVENTION

The present invention relates to methods for closing holes in components that operate at high temperatures, such as holes located at the tips of gas turbine buckets. More particularly, this invention relates to a process of filling holes in castings formed of alloys that are prone to strain age cracking when attempting to fill such holes by conventional welding techniques.

Components of gas turbines, such as buckets (blades), nozzles (vanes), and other hot gas path components, are typically formed of nickel, cobalt or iron-base superalloys with desirable mechanical and environmental properties for turbine operating temperatures and conditions. Because the efficiency of a gas turbine is dependent on its operating temperatures, there is a demand for components, and particularly turbine buckets and nozzles, that are capable of withstanding increasingly higher temperatures. As the maximum local temperature of a superalloy component approaches the melting temperature of the superalloy, forced air cooling becomes necessary. For this reason, airfoils of gas turbine buckets and nozzles often require complex cooling schemes in which air is forced through internal cooling passages within the airfoil and then discharged through cooling holes at the airfoil surface.

Buckets and nozzles formed by casting processes require cores to define the internal cooling passages. During the casting process, shifting of the cores is prevented by supporting the cores within the mold using quartz rods or similar means, which often result in openings (through-holes) in the casting in the region of the bucket tip. These openings must be securely closed or plugged to prevent the loss of cooling air through these openings and ensure proper air flow levels through the intended cooling holes of the casting. Various methods have been used to fill these openings, including brazing and welding techniques, the latter of which includes tungsten inert gas (TIG) welding, electron beam welding, and laser beam welding. As an example, openings have been sealed with a cover plate through welding or brazing processes during post cast-operations. In some cases, welding is not practical for closing or filling holes due to costs, poor fusion weldability of the material, or restrictions arising from the configuration of the component. Furthermore, welding techniques involve application of localized heat energy that produces a fusion zone and a base metal heat-affected zone (HAZ) that are prone to liquation and strain age cracking.

Particularly notable alloys that have found wide use for gas turbine buckets include the gamma prime-strengthened (principally $Ni_3(Al,Ti)$) nickel-base alloys GTD-111® and René N5, which are high strength and oxidation-resistant superalloys often produced as directionally-solidified (DS) and single-crystal (SX) castings for gas turbine applications. GTD-111® has a nominal composition, by weight, of about 14.0% Cr, about 9.5% Co, about 3.0% Al, about 4.9% Ti, about 1.5% Mo, about 3.8% W, about 2.8% Ta, about 0.010% C, the balance nickel and incidental impurities, and N5 has a nominal composition of, by weight, about 7.5% Co, about 7.0% Cr, about 6.5% Ta, about 6.2% Al, about 5.0% W, about 3.0% Re, about 1.5% Mo, about 0.15% Hf, about 0.05% C, about 0.004% B, about 0.01% Y, the balance nickel and incidental impurities. Buckets produced from these alloys have been found to be particularly prone to cracking due to their chemical compositions, and particularly their high volume fraction of gamma prime attributable to the combined amounts of titanium and aluminum in these alloys (greater than five weight percent Ti+Al). As known in the art, when components made from precipitation-hardened alloys are welded, gamma prime ($\gamma'$) and gamma double prime ($\gamma''$) phases are dissolved in and near the weld. When the component later experiences sufficiently high temperatures, these strengthening phases can reprecipitate more rapidly than the relaxation of residual stresses remaining from the welding process. The weld and surrounding area are thus incapable of accommodating the strains required to relieve the residual stresses, with the result that the weld and/or heat-affected zone may crack.

One approach to mitigate or eliminate the tendency for welding cracking is to select a cover material that exhibits better weldability, typically as a result of containing a combined amount of titanium and aluminum of less than the bucket alloy being welded, for example, less than five weight percent Ti+Al. A notable example of such a superalloy is the gamma prime-strengthened nickel-base superalloy GTD-222® having a nominal composition, in weight percent, of about 22.5% Cr, about 19.0% Co, about 2.3% Ti, about 1.2% Al (about 3.5% Ti+Al), about 2.0% W, about 0.8% Nb, about 1.0% Ta, about 0.01% Zr, about 0.01% B, about 0.1% C, with the balance being nickel and incidental impurities. While meeting the weldability requirements for closing bucket tip openings, GTD-222® has lower mechanical properties as compared to GTD-111®. Furthermore, prior welding techniques using weldable superalloys such as GTD-222® have not entirely avoided the occurrence of strain age cracking.

BRIEF DESCRIPTION OF THE INVENTION

The present invention provides a process for closing an opening in a surface of a component, notable examples of which include high temperature superalloy components such as buckets, nozzles, and other hot gas path components of gas turbines.

According to a first aspect of the invention, the process entails forming a channel in the surface of the component so that the channel at least partially surrounds an opening at the surface of the component. An alloy is then deposited in the channel to form a crack-free deposit in the channel. According to a preferred aspect, the deposited alloy has better weldability than the alloy from which the component is formed, for example, as a result of having a lower Ti+Al content. A step is then machined that intersects the opening and is at least partially formed in the deposit. The step defines a recess that is at least partially surrounded by a peripheral portion of the deposit and has a surface recessed into the surface of the component. A cap is then placed in the recess, which is then welded to the peripheral portion of the deposit to define a weld joint that completely closes the opening. The weld joint has a surface formed in part by surfaces of the cap, a weldment surrounding the cap, and the peripheral portion of the deposit. The weld joint surface is then machined to form a machined surface that is substantially flush with the surface of the component.

Another aspect of the invention is a component formed by the process described above.

A feature of the invention is that a component formed of a superalloy that is otherwise difficult to weld is rendered weldable, and openings in the surface of the component can be closed by welding to potentially yield essentially crack-free weld joints.

Other aspects and advantages of this invention will be better appreciated from the following detailed description.

DETAILED DESCRIPTION OF THE INVENTION

Figure 1:
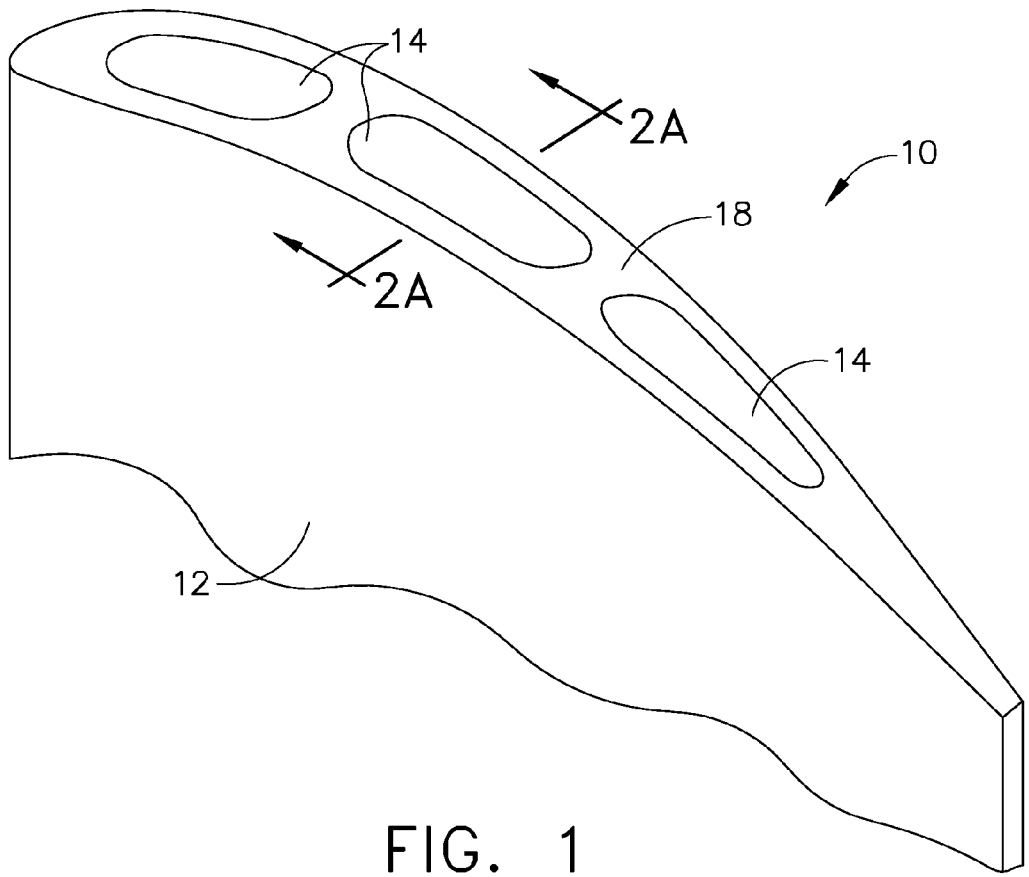
FIG. 1 represents a perspective view of a tip of a gas turbine bucket, showing tip openings that require closing and sealing.

FIG. 1 represents a perspective view of the tip region 12 of a component 10, such as a bucket, nozzle, or other hot gas path component of a gas turbine. As such, the component 10 is preferably a directionally-solidified or single-crystal casting formed of a high-temperature material, notable examples of which include nickel-base superalloys such as René N4, René N5, René 108, GTD-111®, GTD-444° and IN-738. René N4, René N5, René 108, GTD-111® and GTD-444® are gamma prime-strengthened nickel-based superalloys whose compositions are reported in various literature, including U.S. Pat. Nos. 4,810,467, 5,154,884, 5,399,313, 6,074,602, 6,416,596, 6,428,637, and others. The nominal composition of IN-738 is reported as, by weight, about 16% chromium, 8.5% cobalt, 1.75% molybdenum, 2.6% tungsten, 1.75% tantalum, 0.9% niobium, 3.4% aluminum, 3.4% titanium, 0.10% zirconium, 0.01% boron, 0.17% carbon, the balance nickel and impurities. Notably, each of these nickel-base materials nominally has a Ti+Al content of more than five weight percent, and typically more than six weight percent, which generally renders these alloys susceptible to strain age cracking. However, it is foreseeable that the component 10 could be cast from other materials prone to weld-induced cracking, for example, cobalt-base superalloys such as FSX-414, whose nominal composition is, by weight, about 29.5% chromium, 10.5% nickel, 7% tungsten, up to 2% iron, 0.25% carbon, and 0.012% boron, the balance cobalt and incidental impurities. While these alloys are notable for being susceptible to cracking during or after welding, the invention is also applicable to other alloys.

Figure 2A:
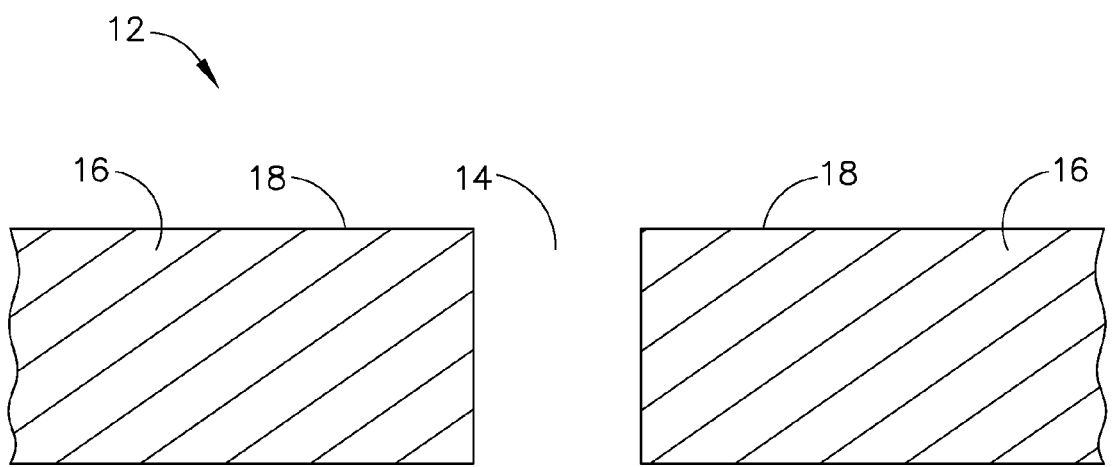
FIG. 2A is a cross-sectional view of one of the openings in the bucket tip of FIG. 1 along section line 2A-2A.

As discussed previously, buckets, nozzles and other hot gas path components formed by casting often require internal cooling passages, necessitating the use of cores during the casting process to define the passages and rods or other suitable means to support and prevent shifting of the cores during casting. FIG. 2A represents in cross-section one of three openings 14 shown as located at the tip region 12 of the component 10 of FIG. 1. The opening 14 is representative of a through-hole that would be created in the casting wall 16 by a rod used to support and prevent shifting of a core during the casting operation, though other sources of holes and other types of holes, including blind holes and cavities, are also within the scope of this invention. In most situations, the opening 14 must be securely closed following the casting operation to prevent the loss of cooling air through the opening 14 once the component 10 is installed in a gas turbine. For this purpose, FIGS. 2B through 2G represent steps in a process for filling and closing the opening 14 in the component 10. According to a preferred aspect of the invention, the opening 14 is closed with the use of a welding process and weld joint configuration that are compatible with the geometry of the tip region of conventional gas turbine buckets and nozzles, and are capable of producing a weld joint having desirable mechanical properties. More particularly, the invention closes the opening 14 with a weld joint (20 in FIG. 2G) comprising multiple weld regions and materials that enable the weld joint 20 to close the opening 14 in a component 10 formed of a potentially crack-prone material (for example, GTD-111® or René N5) with a more weldable and crack-resistant material (for example, GTD-222®). To do so, the weld joint 20 is formed to include a weldment 34 (FIG. 2F) between and metallurgically joining regions of the weld joint 20 formed of more weldable and crack-resistant materials (for example, GTD-222®). In so doing, the process has the potential for completely eliminating cracking due to liquation and strain age phenomena.

Figure 2B:
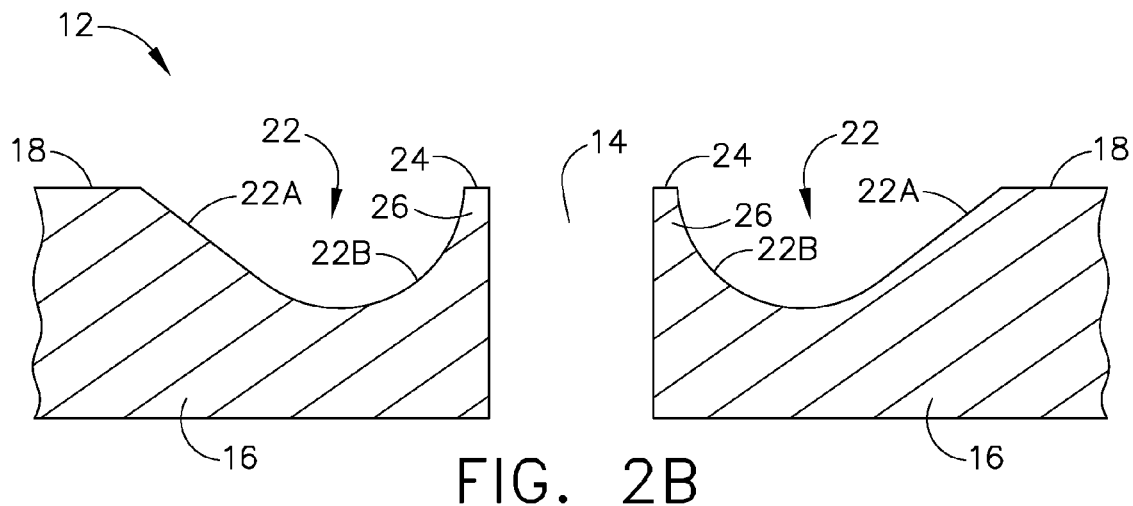
FIGS. 2B through 2G represent steps performed for closing the bucket tip opening of FIG. 2A in accordance with an embodiment of the present invention.

FIG. 2B shows a groove or channel 22 as having been formed in the surface 18 of the component 10 surrounding the opening 14. The channel 22 is immediately adjacent the peripheral edge 24 of the opening 14, but slightly spaced from the edge 24 to form a residual lip 26 surrounding the opening 14. The channel 22 and lip 26 preferably completely surround the opening 14, in which case it should be understood that the two portions of the channel 22 shown in FIGS. 2B through 2G are actually portions of the same channel 22, but separated by the opening 14. However, it should be understood that in some circumstances it may be possible for the channel 22 to surround only part of the opening 14. The channel 22 is shown as having a somewhat U-shaped cross-section, but with the wall 22A of the channel 22 farthest from the opening 14 having a more gradual slope than the wall 22B nearest the opening 14 and defined by the lip 26, producing what might be described as one-half of a teardrop shape. As evident from FIG. 2F, the greater depth of the channel 22 adjacent the lip 26 coincides with the subsequent location of the weldment 34. However, other cross-sectional shapes could be used as long as adequate depth is provided for the weldment 34. Suitable widths and depths for the channel 22 are about 2.0 to about 8.0 millimeters and about 3.0 to about 8.0 millimeters, respectively, though lesser and greater dimensions are foreseeable. Various machining techniques can be used to controllably produce the channel 22 and its preferred cross-sectional shape, examples of which include the use of a lathe, drill and milling machine, as well as machining with hand tools.

Figure 2C:
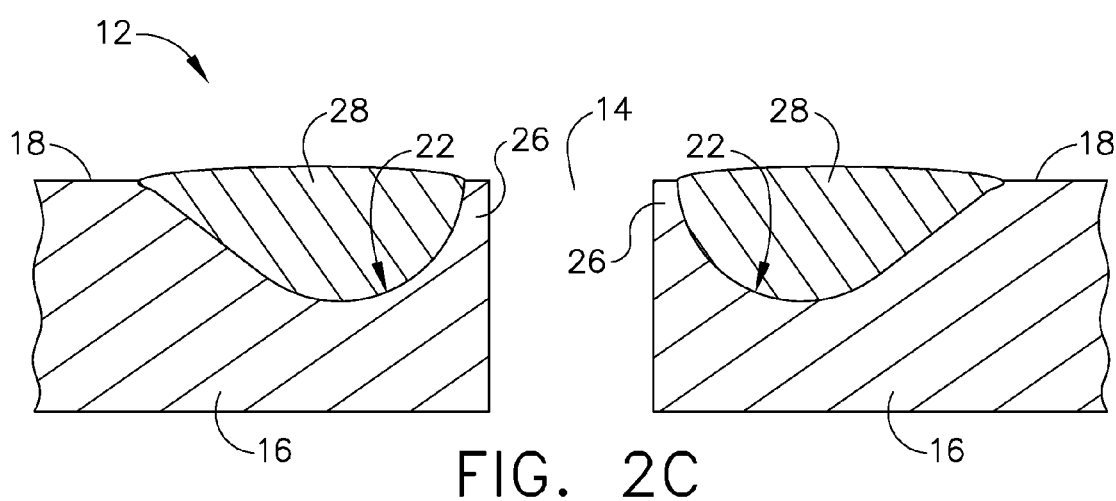
Figure 2D:
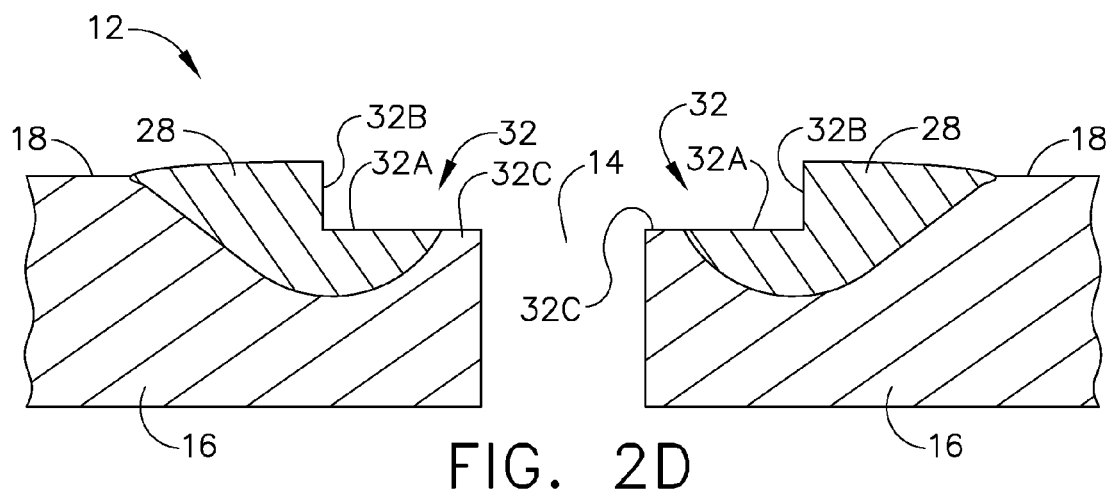
Figure 2E:
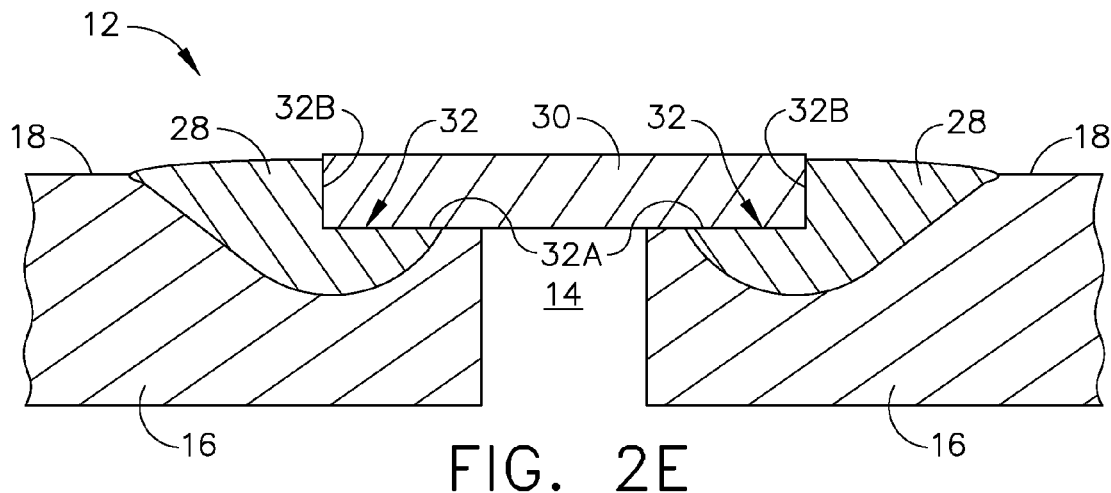
Figure 2F:
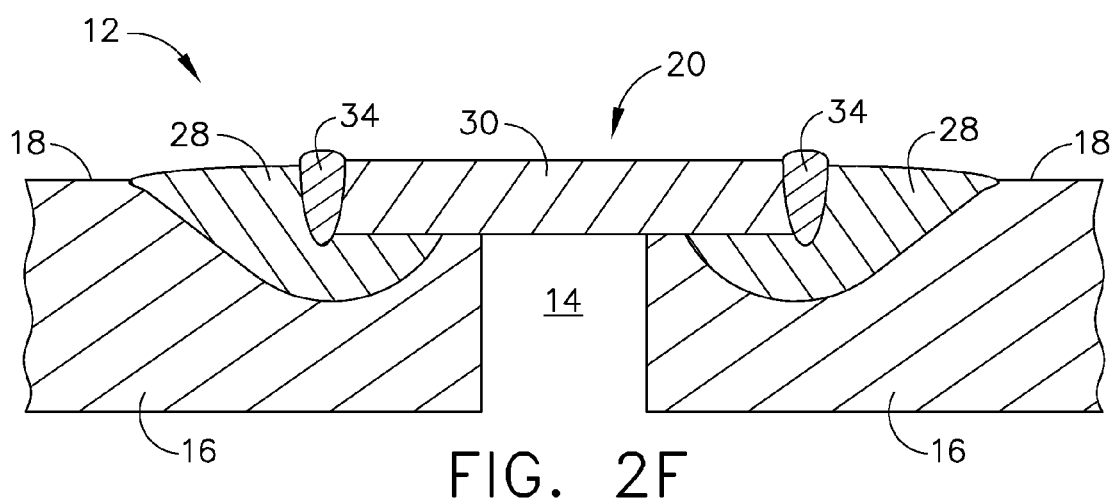
Figure 2G:
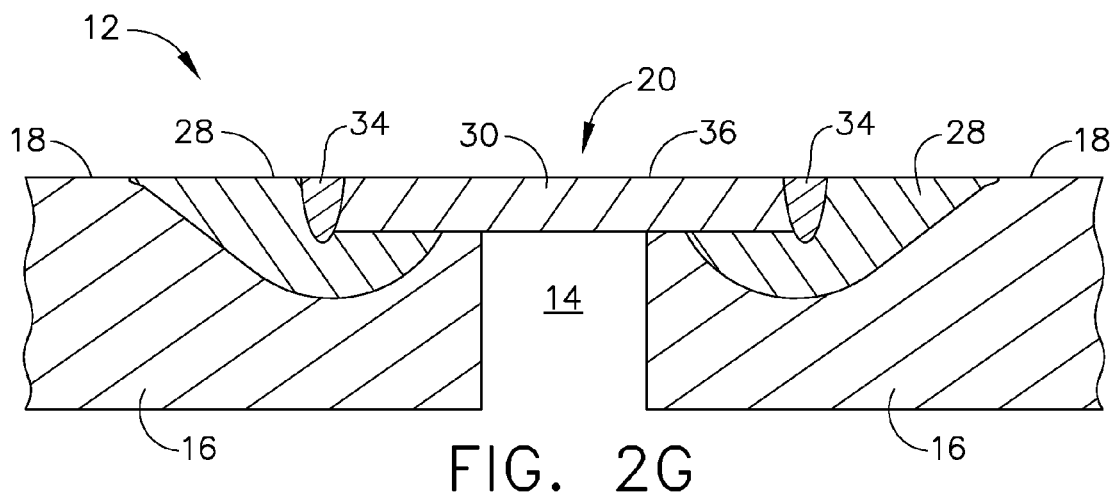

As evident from FIG. 2C, the channel 22 is intended to serve as a reservoir for a deposit 28, which in FIGS. 2E through 2G can be seen to anchor a cap 30 that closes the opening 14. According to a preferred aspect of the invention, the deposit 28 is formed of a material chosen in part on the basis of being more weldable and less prone to strain age cracking than the alloy from which the component 10 is formed. Other desirable properties for the deposit 28 include chemical and metallurgical compatibility with the alloy of the component 10, fatigue strength, oxidation resistance, and machinability. Particularly suitable materials for the deposit 28 are nickel-base alloys having a lower gamma prime content than the superalloy from which the component 10 is formed, typically resulting from a lower Ti+Al content, for example, a Ti+Al content of less than five weight percent. A nonlimiting example of such an alloy is the aforementioned GTD-222® superalloy, whose composition is, by weight, about 22.2-22.8% chromium, about 18.5-19.5% cobalt, about 2.2-2.4% titanium, about 1.1-1.3% aluminum (about 3.2-3.8% titanium+aluminum), about 1.8-2.2% tungsten, about 0.7-0.9% niobium (columbium), about 0.9-1.1% tantalum, about 0.005-0.020% zirconium, about 0.005-0.015% boron, about 0.8-0.12% carbon, with the balance being nickel and incidental impurities.

Various methods can be employed to deposit the material in the channel 22, a notable example being laser powder deposition, though other deposition techniques could be used including plasma powder deposition, etc. Laser powder deposition and other fusion welding techniques with high energy densities are believed to be preferred because of their ability to build up the deposit 28 to have a lower stress state, promoting a fissure-free deposit 28. Such deposition techniques are well known in the art, and therefore will not be described in any detail here. As seen in FIG. 2C, the channel 22 is completely filled and may be slightly overfilled with the deposit 28. As a result, the built-up deposit 28 entirely surrounds the opening 14, but is separated from the opening 14 by the lip 26 formed during the machining of the channel 22.

As shown in FIG. 2D, a step has been machined in the lip 26 and deposit 28 surrounding the opening 14, such that the step intersects the opening 14, is at least partially formed in the deposit 28, and defines a recess 32 that is surrounded by a peripheral portion of the deposit 28. Notably, the depth of the recess 32 does not extend below the deposit 28 in the channel 22, nor does the width of the recess 32 laterally extend beyond the deposit 28 in the channel 22. As a result, most of the lower surface 32A and the entire sidewall surface 32B of the recess 32 are preferably defined by machined surfaces of the deposit 28, with only a fragment of the lower surface 32A nearest the opening 14 being defined by a machined surface 32C of the original wall 16 of the component 10, resulting from some but not all of the lip 26 being removed as evident from FIG. 2D. The width and depth of the recess 32 are chosen on the basis of accommodating a cap 30 (FIGS. 2E through 2G) of sufficient width and thickness to reliably close the opening 14. Suitable widths and depths for the recess 32 are believed to be about 1.0 to about 4.0 millimeters and about 1.0 to about 4.0 millimeters, respectively, though lesser and greater dimensions are foreseeable. In FIGS. 2D and 2E, the lower surface 32A of the recess 32 is represented as substantially parallel to the surface 18 of the component 10, with the result that the cap 30 can have a substantially uniform thickness, though it is foreseeable that the lower surface 32A could slope toward or away from the opening 14.

FIG. 2E shows the result of placing the cap 30 in the recess 32, and FIG. 2F shows the result of welding the cap 30 to the peripheral portion of the deposit 28 surrounding the recess 32. In particular, the cap 30 is welded to the sidewalls 32B of the recess 32, and contacts but is not directly welded to the alloy from which the component wall 16 was formed (the machined surface 32C formed by machining the lip 26 surrounding the opening 14). The result is the aforementioned weld joint 20 and its weldment 34, which form a closure for the opening 14 comprising the cap 30 surrounded by the weldment 34, which in turn is surrounded by the peripheral portion of the deposit 28. If the cap 30 is welded to only the deposit 28 as shown in FIG. 2F, suitable materials for the cap 30 can be primarily chosen on the basis of compatibility with the alloy of the deposit 28, though it will be understood that the coefficient of thermal expansion (CTE) and other physical, mechanical and metallurgical properties will be relevant for achieving suitable compatibility with the component 10. In many cases, the material for the cap 30 can be the very same as the alloy material of the deposit 28, for example, GTD-222®.

Suitable welding techniques include high energy beam processes such as laser welding and electron beam welding, or another fusion welding process. Such welding techniques are well known in the art, and therefore will not be described in any detail here. Because the resulting weldment 34 is limited to metallurgically joining the cap 30 to the deposit 28, and does not directly join the cap 30 to the material of the component 10, the risk of strain age cracking can be greatly reduced and possibly eliminated by appropriately selecting the materials for the deposit 28 and cap 30 as described above.

Finally, FIG. 2G shows the result of machining the surface of the weld joint 20 to form a machined surface 36 that is substantially flush with the surrounding surface 18 of the component 10. Suitable machining techniques for this purpose, as well as other surface processing steps that may be carried out on the machined surface 36, are well known in the art and therefore will not be described here.

While the invention has been described in terms of particular embodiments, it is apparent that other forms could be adopted by one skilled in the art. Therefore, the scope of the invention is to be limited only by the following claims.

The invention claimed is:

1. A process of closing an opening at a surface of a component formed of a first alloy, the process comprising:
    forming a channel in the surface of the component, the channel at least partially surrounding the opening at the surface of the component;
    depositing a second alloy in the channel to form a crack-free deposit in the channel so that the deposit at least partially surrounds the opening, the second alloy having better weldability than the first alloy;
    machining a step that intersects the opening and a surface of the deposit and is at least partially formed in the deposit by removing a portion of the deposit within the channel, the step defining a recess that is at least partially surrounded by a peripheral portion of the deposit and has a machined recessed surface that is at least partially defined by the deposit and recessed into the surface of the component;
    placing a cap in the recess so as to cover the opening at the surface of the component;
    welding the cap to the peripheral portion of the deposit to define a weld joint that completely closes the opening, the weld joint having a surface formed in part by surfaces of the cap, a weldment surrounding the cap, and the peripheral portion of the deposit; and then
    machining the surface of the weld joint to form a machined surface that is at the surface of the component and defined by portions of the cap, the weldment, and the peripheral portion of the deposit.

2. The process according to claim 1, wherein the channel is formed to completely surround the opening.

3. The process according to claim 1, wherein the channel is formed to define a lip in the surface of the component that separates the channel from the opening in the surface of the component, and the machining of the step to define the recess removes some but not all of the lip.

4. The process according to claim 3, wherein the channel is formed to completely surround the opening, and the lip entirely separates the channel from the opening in the surface of the component.

5. The process according to claim 1, wherein the second alloy is deposited so that the deposit completely surrounds the opening.

6. The process according to claim 1, wherein the step is machined to completely surround the opening and the entire perimeter of the opening is intersected by the step.

7. The process according to claim 1, wherein the step is machined so that the peripheral portion of the deposit completely surrounds the recess.

8. The process according to claim 1, wherein the cap is welded only to the peripheral portion of the deposit.

9. The process according to claim 1, wherein the step is machined so that the surface of the recess is parallel to the surface of the component.

10. The process according to claim 1, wherein the first alloy is a nickel-base superalloy containing a combined amount of aluminum and titanium of greater than five weight percent.

11. The process according to claim 1, wherein the second alloy is a nickel-base superalloy containing a combined amount of aluminum and titanium of less than five weight percent.

12. The process of claim 1, wherein the component is a cast hot gas path component of a gas turbine.

13. A process of filling an opening in a hot gas path component of a gas turbine, the component being cast from a first nickel-base superalloy and the opening being formed by a rod that supported a core within the component during casting of the component, the process comprising:
   forming a channel in a surface of the component, the channel completely surrounding the opening at the surface of the component;
   depositing a second nickel-base superalloy in the channel to form a crack-free deposit in the channel that completely surrounds the opening at the surface of the component, the second nickel-base superalloy having better weldability than the first nickel-base superalloy as a result of having a lower Ti+Al content than the first nickel-base superalloy;
   machining a step that is at least partially formed in the deposit by removing a portion of the deposit within the channel, wherein the step intersects a surface of the deposit, is completely surrounded by a peripheral portion of the deposit, and completely surrounds and intersects the entire perimeter of the opening, the step defining a recess that is completely surrounded by the peripheral portion of the deposit and has a machined recessed surface that is at least partially defined by the deposit and recessed into the surface of the component;
   placing a cap in the recess so as to cover the opening at the surface of the component;
   welding the cap to only the peripheral portion of the deposit to define a weld joint that completely closes the opening, the weld joint having a surface at which a surface of the cap is surrounded by a surface of a weldment that is surrounded by a surface of the peripheral portion of the deposit; and then machining the weld joint to form a machined surface that is flush with the surface of the component and defined by portions of the cap, the weldment, and the peripheral portion of the deposit.

14. The process according to claim 13, wherein the channel is formed to define a lip in the surface of the component that completely separates the channel from the opening in the surface of the component, and the machining of the step to define the recess removes some but not all of the lip.

15. The process according to claim 13, wherein the second nickel-base superalloy is deposited by a laser powder deposition process.

16. The process according to claim 13, wherein the first nickel-base superalloy contains a combined amount of aluminum and titanium of greater than five weight percent, and the second nickel-base superalloy contains a combined amount of aluminum and titanium of less than five weight percent.

17. The process according to claim 16, wherein the first nickel-base superalloy has a nominal composition, in weight percent, of about 14.0% Cr, about 9.5% Co, about 3.0% Al, about 4.9% Ti, about 1.5% Mo, about 3.8% W, about 2.8% Ta, about 0.010% C, the balance nickel and incidental impurities.

18. The process according to claim 16, wherein the first nickel-base superalloy has a nominal composition of, by weight, about 7.5% Co, about 7.0% Cr, about 6.5% Ta, about 6.2% Al, about 5.0% W, about 3.0% Re, about 1.5% Mo, about 0.15% Hf, about 0.05% C, about 0.004% B, about 0.01% Y, the balance nickel and incidental impurities.

19. The process according to claim 13, wherein the second nickel-base superalloy consists essentially of, by weight, of about 22.2-22.8% chromium, about 18.5-19.5% cobalt, about 2.2-2.4% titanium, about 1.1-1.3% aluminum, about 3.2-3.8% titanium+aluminum, about 1.8-2.2% tungsten, about 0.7-0.9% niobium, about 0.9-1.1% tantalum, about 0.005-0.020% zirconium, about 0.005-0.015% boron, about 0.8-0.12% carbon, with the balance being nickel and incidental impurities.

20. The process of claim 13, wherein the component is chosen from the group consisting of turbine buckets and turbine nozzles.

* * * * *

UNITED STATES PATENT AND TRADEMARK OFFICE
CERTIFICATE OF CORRECTION

| | | |
|---|---|---|
| PATENT NO. | : 8,987,629 B2 | Page 1 of 1 |
| APPLICATION NO. | : 12/511494 | |
| DATED | : March 24, 2015 | |
| INVENTOR(S) | : Cui et al. | |

It is certified that error appears in the above-identified patent and that said Letters Patent is hereby corrected as shown below:

In the specification
In Column 3, Line 22, delete "GTD-444°" and insert -- GTD-444® --, therefor.

Signed and Sealed this
First Day of December, 2015

Michelle K. Lee
*Director of the United States Patent and Trademark Office*